US012401955B2

(12) United States Patent
Henriksen et al.

(10) Patent No.: US 12,401,955 B2
(45) Date of Patent: Aug. 26, 2025

(54) HEARING DEVICE WITH CHARGING AREAS

(71) Applicant: Oticon A/S, Smørum (DK)

(72) Inventors: Poul Henriksen, Veksø (DK); Mikkel Finmand Kjær Nielsen, Smørum (DK); Jens Troelsen, Smørum (DK); Christian Asp Mogensen, Smørum (DK); Michel Berg, Smørum (DK)

(73) Assignee: Oticon A/S, Smørum (DK)

( * ) Notice: Subject to any disclaimer, the term of this patent is extended or adjusted under 35 U.S.C. 154(b) by 217 days.

(21) Appl. No.: 17/981,989

(22) Filed: Nov. 7, 2022

(65) Prior Publication Data

US 2023/0148224 A1 May 11, 2023

(30) Foreign Application Priority Data

Nov. 8, 2021 (EP) .................................... 21206843

(51) Int. Cl.
*H04R 25/00* (2006.01)

(52) U.S. Cl.
CPC ....... *H04R 25/554* (2013.01); *H04R 2225/31* (2013.01)

(58) Field of Classification Search
CPC .............. H04R 1/1025; H04R 2225/31; H04R 25/554; H04R 1/10; H04R 25/556
USPC .......................................................... 381/323
See application file for complete search history.

(56) References Cited

U.S. PATENT DOCUMENTS

| | | | | |
|---|---|---|---|---|
| 9,060,233 | B2 | 6/2015 | Shennib et al. | |
| 11,240,583 | B1 * | 2/2022 | DeMaio | H01M 10/48 |
| 2016/0134959 | A1 | 5/2016 | Shaffer | |
| 2018/0020302 | A1 | 1/2018 | Rasmussen et al. | |

FOREIGN PATENT DOCUMENTS

| | | | |
|---|---|---|---|
| WO | WO 2008/037747 | A1 | 4/2008 |
| WO | WO 2018/128577 | A2 | 7/2018 |
| WO | WO 2018/128577 | A3 | 7/2018 |

OTHER PUBLICATIONS

Extended European Search Report issued in Application No. 21206843.1 dated Apr. 11, 2022.
European Communication pursuant to Article 94(3) EPC for European Application No. 22205296.1, dated Mar. 18, 2025.

* cited by examiner

*Primary Examiner* — Phylesha Dabney
(74) *Attorney, Agent, or Firm* — Birch, Stewart, Kolasch & Birch, LLP

(57) ABSTRACT

There is presented a hearing device for being placed at least partially in an ear canal. The hearing device includes a rechargeable battery, and at least two charging areas on the surface of the hearing device, the charging areas enabling recharging the rechargeable battery by applying a voltage from one charging area to another charging area. At least one charging area is positioned on the hearing device at the end of the hearing device facing into the middle ear during use and optionally out of contact with the walls of the ear canal during use.

16 Claims, 3 Drawing Sheets

HEARING DEVICE WITH CHARGING AREAS

FIELD

The present disclosure relates to a hearing device. More particularly, the disclosure relates to hearing devices with charging areas enabling recharging the rechargeable battery, and the present disclosure furthermore relates to a corresponding charging station, a system and a method.

BACKGROUND

Charging a hearing device (HI), such as a custom style HI, may be challenging because of the custom nature with its individual shapes that limits the amount of well known surfaces to connect to, electrically or magnetically, contact or contactless. Furthermore, a possibly small size may further add to the challenges. It is noted that the size of, e.g., an in-the-ear hearing aid may be considered an important parameter, e.g., as it dictates the amount of users the instruments can fit and/or because a smaller size is advantageous for reducing or eliminating the visual appearance of the hearing aid when placed in the ear canal of a user. A small size and/or a custom shaped ear shell might thus increase demands for vision and dexterity required for providing power to the hearing aid (such as replacing or recharging a discharged battery).

Therefore, there is a need to provide a solution that overcomes or mitigates the challenges with charging a hearing device, such as enables reducing size and/or having a custom ear shell while still facilitating (easily and/or simply) providing power to the hearing aid.

SUMMARY

According to a first aspect, there is provided a hearing device for being placed at least partially in an ear canal, wherein said hearing device comprises a. A rechargeable battery, b. A least two charging areas on the surface of the hearing device, said charging areas enabling recharging the rechargeable battery by applying a voltage from one charging area to another charging area, and wherein at least one charging area is positioned on the hearing device at the end of the hearing device facing into the middle ear during use.

The term "the end of the hearing device" as used above may be defined as half of, or a part of, the instrument, where a fictitious plane through the device between the two ends, possibly with equal distances to said ends, splits the device in two parts, said plane being orthogonal to an axis of the ear canal during use.

When charging a custom-made hearing device having a rechargeable battery, the (very) small and individually shaped instruments may be difficult to connect to either by electrical contact or without contact.

Other than making the charging difficult to do from a technical perspective, it may also make it increasingly difficult for the user to handle the charging situation because better vision and dexterity is required in turn.

It may thus be seen as an advantage of the present invention that it facilitates charging in an easy and simple manner, where the requirements to vision and dexterity may be seen as limited or low, e.g., since it may only be required to place the hearing aid on or in a charger or charging station, and since the charging areas may then be fixed to the hearing device they may automatically then be placed in an appropriate position for charging, such as in electrical contact with contacts for charging. This may dispense with the need for carefully placing electrical leads in contact with charging pads or carefully positioning and/or orienting the hearing device into a suitable position and/or orientation for charging.

For example, if a custom HI has a part extending out of the HI in the end facing into the ear, it can be fitted with contact surfaces (such as areas) suitable for electrical charging of the HI. This end of the HI is particularly beneficial as it does not touch the ear canal and therefore not part of the custom surface and can be made in a well-known geometry to allow use of a standard charger or charging station to reduce cost.

Also, the in-ear end of the HI has limited size variation compared to the opposite/outer end that allow a standard opening of a charger to give better support than if the opposite/outer end should be accommodated.

Hearing aid may be referred to interchangeably with Hearing device or Instrument.

By 'hearing aid' may generally be understood a hearing device adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal. A 'hearing aid' may be understood as is common in the art, such as a hearing aid adapted to be worn entirely or partly in the pinna and/or in the ear canal of the user.

According to an embodiment, the hearing aid is an in-the-ear hearing aid, such as the in-the-ear (ITE) hearing aid is an 'In-the-Canal' (ITC) hearing aid and/or a 'Completely-in-Canal' hearing aid and/or a Invisibly In Canal (IIC) hearing aid and/or a Completely In Canal (CIC) hearing aid. An 'in-the-ear' type hearing aid may be understood to encompass also an 'In-the-Canal' hearing aid and/or a 'Completely-in-Canal' hearing aid and/or a Invisibly In Canal (IIC) hearing aid and/or a Completely In Canal (CIC) hearing aid.

By 'the end of the hearing device facing into the middle ear during use' may be understood that a fictitious plane (being orthogonal to a line extending through the HI along a main axis, such as an axis being coincidental with an axis of an ear canal when the instrument is placed in an ear canal of a user), may separate the HI into a first end being configured to face the environment when the hearing device is worn in its operational state AND/OR where the second end of the HI is configured to extend at least partially into the ear canal of the person using the hearing device when the hearing device is worn by the person. Thus, the ends may be defined as half of the instrument, where a fictitious plane through the middle of the device—with equal distances to both ends—splits the device in two (said plane being orthogonal to an axis of the ear canal during use).

Thus, by having 'at least one charging area is positioned on the hearing device at the end of the hearing device facing into the middle ear during use' it may be understood that the at least one charging area is positioned on (such as may be projected onto) the first 50% of an axis, which extends from the most distant point (with respect to said fictitious plane) on the end which extends into the ear canal during use to the most distant point (with respect to said fictitious plane) on the (opposite) end which faces the exterior during use. In embodiments, the at least one charging area is positioned on the first 40%, such as the first 30%, such as the first 20%, such as the first 10%, such as the first 5%, such as the first 1%, of this axis (such as the axis which extends from the most distant part of the second end (i.e., the part which is furthest into the ear canal during use) through the fictitious plane and to the most distant part of the first end (i.e., the part which faces the exterior during normal use)).

In a hearing device according to the present disclosure, at least one charging area, such as two charging areas, may be positioned on the hearing device so as to be out of contact with the walls of the ear canal during use. It may be seen as an advantage that at least one charging area is positioned on the hearing device and out of contact with the walls of the ear canal during use, because then a risk of electrical contact with the ear canal is reduced or minimized or eliminated.

In a hearing device according to the present disclosure, at least two charging areas may be positioned on the hearing device at the end of the hearing device facing into the middle air during use and out of contact with the walls of the ear canal during use. An advantage of this may be that two charging areas are required for charging, such as for applying a voltage difference across the charging areas, and by having both charging areas positioned this way, one or more advantages mentioned above may be achieved for both (such as all) charging areas.

In a hearing device according to the present disclosure, the hearing device may comprise a protrusion being positioned at the end of the hearing device facing into the middle ear during use and out of contact with the walls of the ear canal during use. An advantage of this protrusion may be that it need not contact that ear canal and can thus be shaped in a standard way (such as non-custom shaped), which may fit into a standard shaped charging station.

In a hearing device according to the present disclosure, wherein one or more, such as two, charging areas may be positioned on the protrusion. An advantage of this may be that one or more charging areas on the protrusion may contact a correspondingly placed contact in a (standard) charging station.

In a hearing device according to the present disclosure, such a hearing device may comprise a housing, wherein one or more charging areas are positioned on the housing of the hearing device. An advantage of this may be that the charging areas are accessible from the outside, thus it might be relatively easy and/simple to make electrical contact to the charging areas for the purpose of charging.

In a hearing device according to the present disclosure, the hearing device may include a housing having a first end and a second end being opposite to the first end, where the first end is configured to face the environment when the hearing device is worn in its operational state AND/OR where the second end of the housing is configured to extend at least partially into the ear canal of the person using the hearing device when the hearing device is worn by the person. By the first end and the second end of the housing may be understood that a fictitious plane (being orthogonal to a line extending through the housing along a main axis, such as an axis being coincidental with an axis of an ear canal when the instrument is placed in an ear canal of a user), may separate the housing into a first end being configured to face the environment when the hearing device is worn in its operational state AND/OR where the second end of the housing is configured to extend at least partially into the ear canal of the person using the hearing device when the hearing device is worn by the person. Thus, the ends may be defined as half of the housing, where a fictitious plane through the middle of the housing—with equal distances to both ends—splits the housing in two (said plane being orthogonal to an axis of the ear canal during use).

In a hearing device according to the present disclosure, a protrusion may at least partially comprise a speaker unit and/or a speaker outlet. It is noted that a part of the speaker may extend into and/or beyond the housing.

In a hearing device according to the present disclosure, at least a distant part of the second end of the hearing device, such as the second end of the hearing device, such as the hearing device, may be defining a main axis, such as at least the distant part of the second end of the hearing device and/or the second end of the hearing device and/or the hearing device being substantially rotationally symmetrical around said main axis and/or such as the main axis being substantially coincidental to an axis of the ear canal of a person wearing the hearing device in the ear canal during use, and one or more, such as two, charging areas being equal to or less than X mm away from said main axis, wherein X is less than 5 mm, such as less than 4 mm, such as less than 3 mm, such as less than 2 mm, such as less than 1 mm. An advantage of this may that it might reduce or minimize or eliminate a risk that the one or more charging areas come into contact with an ear canal during use.

In a hearing device according to the present disclosure, one or more, such as two, charging areas may be equal to or less than X mm away from an axis of an ear canal during use, such as when a person is wearing the hearing device in an ear canal, wherein X is less than 5 mm, such as less than 4 mm, such as less than 3 mm, such as less than 2 mm, such as less than 1 mm. An advantage of this may that it might reduce or minimize or eliminate a risk that the one or more charging areas come into contact with an ear canal during use.

According to a second aspect, there is presented a binaural system comprising two hearing devices according to the first aspect. The hearing aids may be arranged in a "binaural (hearing) system", such as a system comprising two hearing aids where the two hearing aids are adapted to cooperatively provide audible signals to both of the user's ears.

According to a third aspect, there is presented a charging station for charging a hearing device according to the first aspect, said charging station comprising a concavity configured for receiving at least part of the end of the hearing device facing into the middle ear during use, such as at least a part of the second end, and wherein said concavity is arranged with electrical contacts for applying a voltage from one charging area to another charging area, when at least part of the end of the hearing device facing into the middle ear during use is placed in the concavity. A possible advantage of such charging station may be that it enables simple and/or easy charging of the hearing device since it simply requires that the hearing device, or more specifically the end of the hearing device facing into the middle ear during use, is placed into the concavity, and the concavity may serve to guide the hearing device into a correct position where the charging areas of the HI are brought into contact with electrical contacts of the charging station. Another possible advantage may be that the end of the hearing device facing into the middle ear during use may be quite similar from one hearing device to another or even from one type of hearing device to another, so that a similar or even identical charging station may be used for different—even different custom designed—hearing devices.

In a charging station according to the present disclosure, the concavity is part of a replaceable insert may be configured to mate a specific hearing device, and wherein the replaceable insert may having an interface for the remainder of the charging station so that electrical connection is established from the remainder of the charging station to the hearing device is established when the insert and the hearing device is placed in the remainder of the charging station. A possible advantage of this may be that the insert may ensure that a charging station may be adapted to a given hearing device. Thus, the remainder of the charging station (such as the charging station without the insert, where the charging station without the insert might be the main part of the charging station) may be provided as identical units, which may be mass produced in a cost-effective manner, and then the insert parts may be different or even custom designed to ensure that a hearing device can fit into the standard charging station with the insert. The insert may function as an adapter ensuring compatibility with different hearing devices.

According to a fourth aspect, there is presented a system comprising a hearing device according to the first aspect, and a charging station according to the third aspect.

An advantage of this system may be that it facilitates charging in an easy and simple manner, where the requirements to vision and dexterity may be seen as limited or low, e.g., since it may only be required to place the hearing aid in the charging station. This may dispense with the need for carefully placing electrical leads in contact with charging pads or carefully positioning and/or orienting the hearing device into a suitable position and/or orientation for charging.

According to a fifth aspect, there is presented a method for charging a rechargeable battery of a hearing device according to the first aspect, said method comprising a. Placing at least part of the end of the hearing device facing into the middle ear during use into in the concavity of a charging station according to the third aspect, such as so that a plurality of charging areas are each in electrical contact with respective electrical contacts,
b. Applying a voltage from one charging area to another charging area.

This method may be beneficial for providing a method for simple and easy charging.

The features and/or technical details outlined above may be combined in any suitable ways.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the hearing device, binaural system, charging station, system and method are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
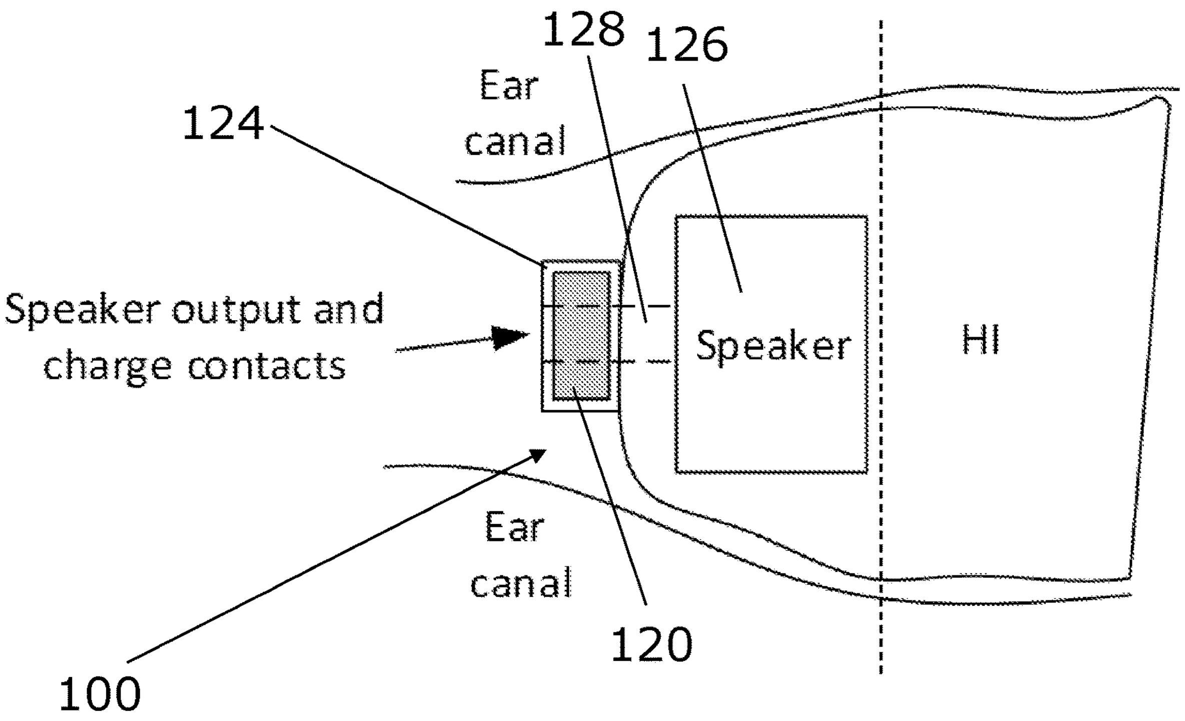
FIG. 1 is a schematic showing a sideview of a hearing device.

FIG. 1 is a schematic showing a sideview of a hearing device 100 for being placed at least partially in an ear canal, wherein said hearing device comprises a. A rechargeable battery,
b. A least two charging areas 120 (only one is shown in this figure) on the surface of the hearing device, said charging areas enabling recharging the rechargeable battery by applying a voltage from one charging area to another charging area, and wherein at least one charging area is positioned on the hearing device at the end of the hearing device facing into the middle ear during use (which in the figure is the left end). The vertical dashed line at the right side of the speaker 126 indicates a virtual plane through the middle of the hearing aid, which plane has one the right side the first end facing an exterior during use and the left side the second end facing into the ear canal during use.

In the depicted embodiment, at least one charging area 120 is positioned on the first 20%, of the axis which extends from the most distant part of the second end (i.e., the part which is furthest into the ear canal during use, i.e., the left end in the figure) through the fictitious plane and to the most distant part of the first end (i.e., the part which faces the exterior during normal use, i.e., the right end in the figure). The figure also shows that at least one charging area 120 is positioned on the hearing device so as to be out of contact with the walls of the ear canal during use. The figure furthermore shows that 4. the hearing device 100 comprises a protrusion 124 being positioned at the end of the hearing device 100 facing into the middle ear during use and (said protrusion being) out of contact with the walls of the ear canal during use. The protrusion 124 at least partially comprises a speaker unit 126 and/or a speaker outlet 128. The protrusion 124 extends from the hearing instrument housing so that one, two or more charge points/pads may be placed thereon. The diameter/cross-sectional size is small enough so that the protrusion 124 may be placed with no or low risk of it touching the ear canal wall when the device is mounted in the or at the ear canal as disclosed herein.

The hearing device 100 is defining a main axis (not shown) which could be depicted as a horizontal line from one side of the paper to the other side of the paper and intersecting a middle of the charging area 120. The main axis would be substantially coincidental with an axis of an ear canal during use.

Figure 2:
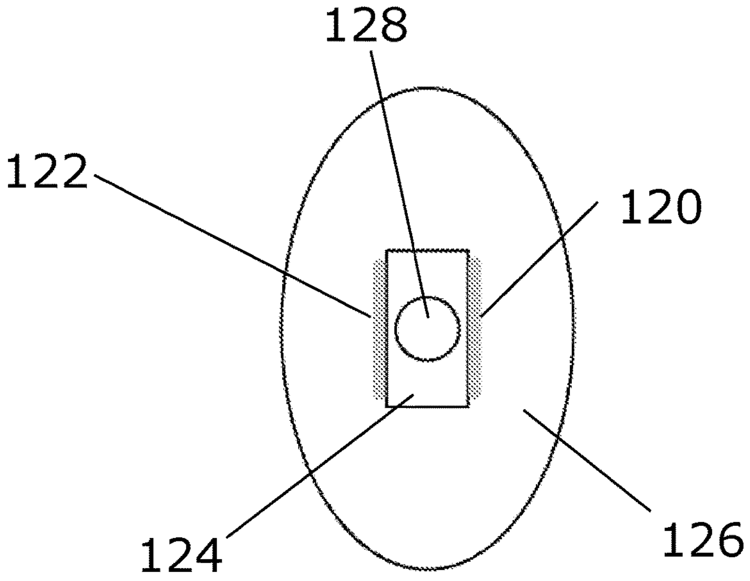
FIG. 2 is a schematic showing an endview of a hearing device.

FIG. 2 is a schematic showing an endview of a hearing device 100 for being placed at least partially in an ear canal, wherein it can be seen that said hearing device comprises at least two charging areas 120, 122 that are positioned on the hearing device 100 at the end of the hearing device 100 facing into the middle air during use and out of contact with the walls of the hearing device 100 during use. The figure furthermore shows that two charging areas 120, 122 are positioned on the protrusion 124.

Figure 3:
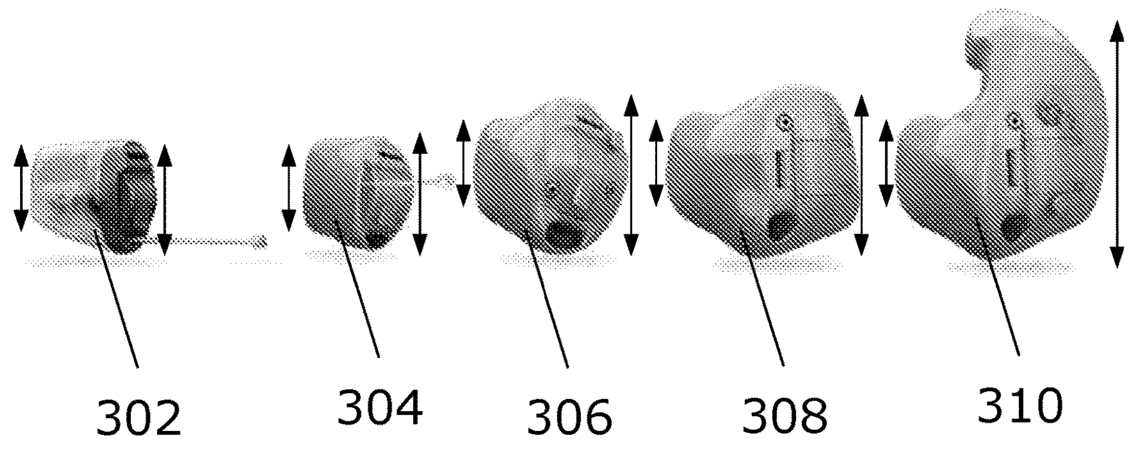
FIG. 3 shows a selection of hearing devices.

FIG. 3 shows a selection of hearing devices, which could each be the hearing device of one or more embodiments of the invention, the selection including an invisible-in-the-ear-canal (IIC) type hearing aid (302), a completely-in-the-canal (CIC) type hearing aid (304), an in-the-canal (ITC) type hearing aid (306), and in-the-ear (ITE) type hearing aid (308, 310).

Figure 4:
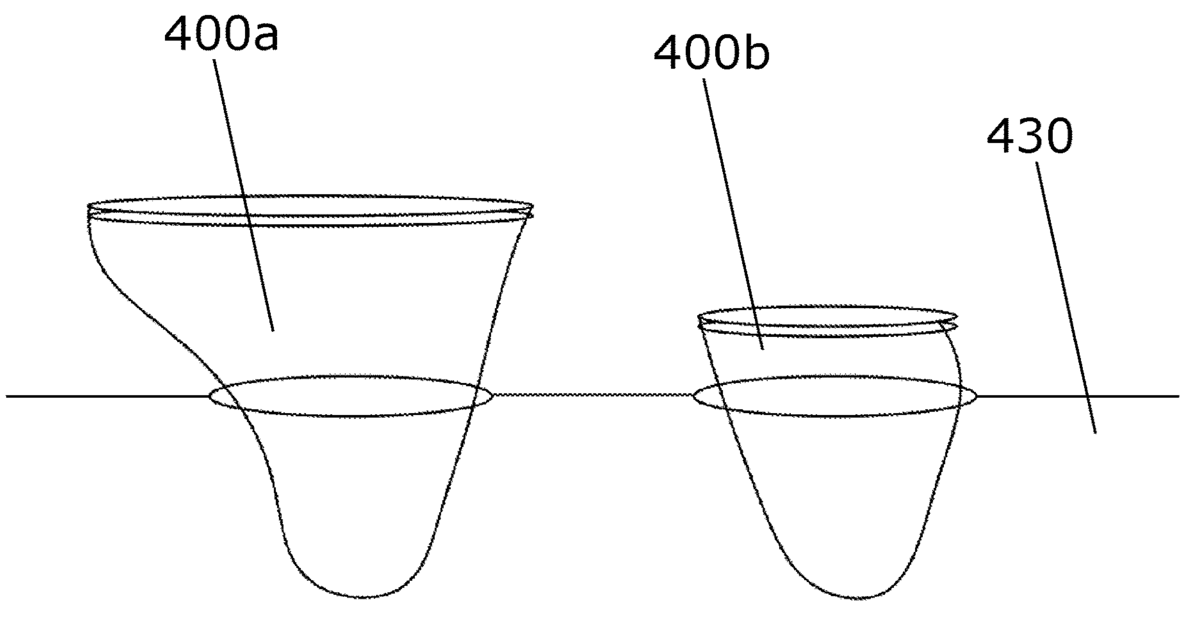
FIG. 4 shows a charging station for charging a hearing device.

FIG. 4 shows a charging station for charging a hearing device 100, said charging station comprising a concavity configured for receiving at least part of the end of the hearing device 100 facing into the middle ear during use, and wherein said concavity is arranged with electrical contacts for applying a voltage from one charging area to another charging area, when at least part of the end of the hearing device 100 facing into the middle ear during use is placed in the concavity. Since FIG. 4 also shows hearing devices 400*a*, 400*b* FIG. 4 also shows a system comprising a hearing device 400*a*, 400*b* and a charging station 430.

In one version, a part, or end, of the hearing instrument could have a certain diameter at a certain distance from the tip/end, so that irrespective of the remainder of the instrument, one end could fit into a charger volume/concavity and reliably connect to contact pads or be charged via wireless charging. This could be seen as the circles in FIG. 4. The part of the instrument going into the concavity should then be shaped so that the diameter at a given distance from the tip decreases the closer you get to the tip.

Two charging areas may be placed opposite each other at the surface of the hearing device, such as at opposite sites at the exterior of the surface of the hearing device.

Figure 5:
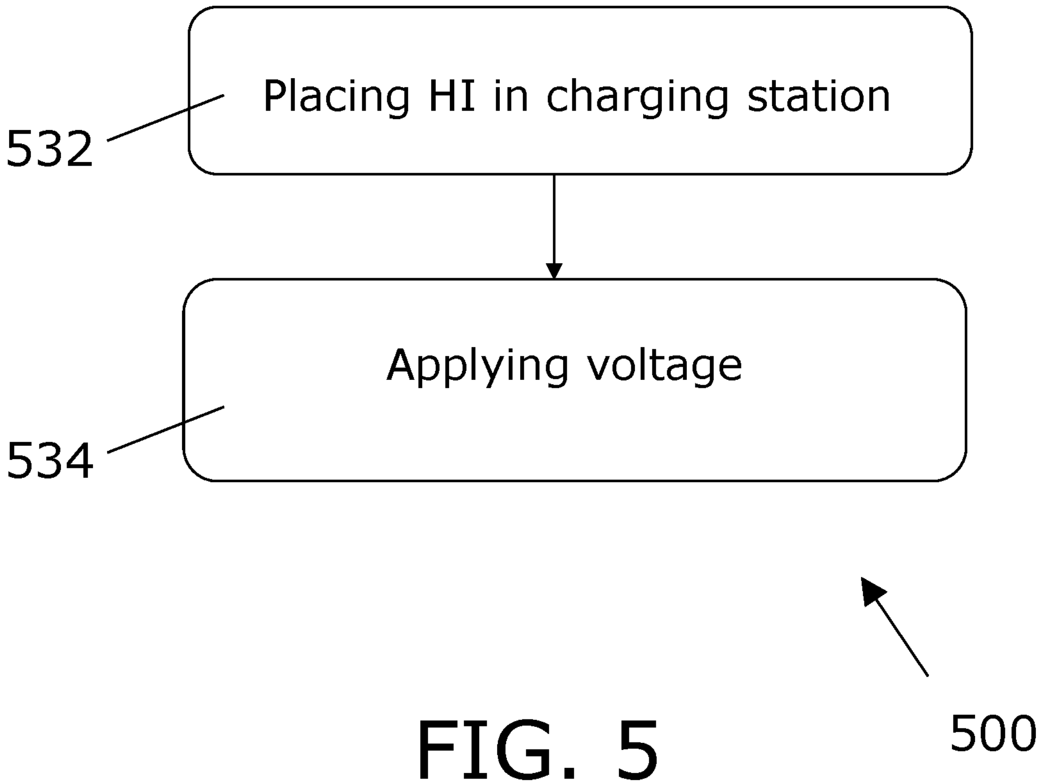
FIG. 5 illustrates method for charging a rechargeable battery of a hearing device.

FIG. 5 illustrates method for charging a rechargeable battery of a hearing device 100, said method comprising a. Placing 532 at least part of the end of the hearing device 100 facing into the middle ear during use into in the concavity of a charging station, such as so that a plurality of charging areas are each in electrical contact with respective electrical contacts, b. Applying 534 a voltage from one charging area to another charging area.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise.

Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing device having a housing configured for being placed at least partially in an ear canal of a user, the housing having an end configured to be positioned in the ear canal of the user and an end configured to be orientated towards the surrounding of the user when the hearing device is positioned at the ear canal of the user, wherein said hearing device comprises a rechargeable battery; and at least two charging areas on the surface of the housing of the hearing device, said charging areas enabling recharging the rechargeable battery by applying a voltage from one charging area to another charging area, wherein at least one charging area is positioned on the hearing device at the end of the hearing device facing into the middle ear during use, wherein the hearing device comprises a protrusion extending from the housing and being positioned at the end of the hearing device facing into the middle ear during use and out of contact with the walls of the ear canal during use and wherein two charging areas are positioned on the protrusion, and wherein the protrusion at least partially comprises a speaker unit and/or a speaker outlet.

2. The hearing device according to claim 1, wherein at least one charging area, such as two charging areas, is positioned on the hearing device so as to be out of contact with the walls of the ear canal during use.

3. The hearing device according to claim 2, wherein at least two charging areas are positioned on the hearing device at the end of the hearing device facing into the middle air during use and out of contact with the walls of the ear canal during use.

4. The hearing device according to claim 2, wherein the hearing device includes a housing having a first end and a second end being opposite to the first end, where the first end is configured to face the environment when the hearing device is worn in its operational state AND/OR where the second end of the housing is configured to extend at least partially into the ear canal of the person using the hearing device when the hearing device is worn by the person.

5. The hearing device according to claim 1, wherein at least two charging areas are positioned on the hearing device at the end of the hearing device facing into the middle air during use and out of contact with the walls of the ear canal during use.

6. The hearing device according to claim 5, wherein the hearing device includes a housing having a first end and a second end being opposite to the first end, where the first end is configured to face the environment when the hearing device is worn in its operational state AND/OR where the second end of the housing is configured to extend at least partially into the ear canal of the person using the hearing device when the hearing device is worn by the person.

7. The hearing device according to claim 1, wherein the hearing device includes a housing having a first end and a second end being opposite to the first end, where the first end is configured to face the environment when the hearing device is worn in its operational state AND/OR where the second end of the housing is configured to extend at least partially into the ear canal of the person using the hearing device when the hearing device is worn by the person.

8. The hearing device according to claim 1, wherein the protrusion includes a sound canal in communication with the speaker unit or speaker outlet.

9. The hearing device according to claim 1, wherein two charging areas are arranged opposite on the surface of the hearing device.

10. The hearing device according to claim 1, wherein at least a distant part of the second end of the hearing device is defining a main axis, and one or more charging areas are no more than X mm away from said main axis hearing device, wherein X is less than 5 mm.

11. The hearing device according to claim 1, wherein one or more charging areas are no more than X mm away from an axis of an ear canal during use, wherein X is less than 5 mm.

12. A binaural system comprising two hearing devices according to claim 1.

13. A charging station for charging a hearing device having a housing configured for being placed at least partially in an ear canal of a user, the housing having an end configured to be positioned in the ear canal of the user and an end configured to be orientated towards the surrounding of the user when the hearing device is positioned at the ear canal of the user, wherein said hearing device comprises a rechargeable battery; and at least two charging areas on the surface of the housing of the hearing device, said charging areas enabling recharging the rechargeable battery by applying a voltage from one charging area to another charging area, wherein at least one charging area is positioned on the hearing device at the end of the hearing device facing into the middle ear during use, wherein the hearing device comprises a protrusion extending from the housing and being positioned at the end of the hearing device facing into the middle ear during use and out of contact with the walls of the ear canal during use and wherein two charging areas are positioned on the protrusion, said charging station comprising a concavity configured for receiving at least part of the end of the hearing device facing into the middle ear during use, and wherein said concavity is arranged with electrical contacts for applying a voltage from one charging area to another charging area, when at least part of the end of the hearing device facing into the middle ear during use is placed in the concavity.

14. The charging station according to claim 13, wherein the concavity is part of a replaceable insert configured to mate a specific hearing device, and wherein the replaceable insert has an interface for the remainder of the charging station so that electrical connection is established from the remainder of the charging station to the hearing device is established when the insert and the hearing device is placed in the remainder of the charging station.

15. A system comprising a hearing device having a housing configured for being placed at least partially in an ear canal of a user, the housing having an end configured to be positioned in the ear canal of the user and an end configured to be orientated towards the surrounding of the user when the hearing device is positioned at the ear canal of the user, wherein said hearing device comprises a rechargeable battery; and at least two charging areas on the surface of the housing of the hearing device, said charging areas enabling recharging the rechargeable battery by applying a voltage from one charging area to another charging area, and wherein at least one charging area is positioned on the hearing device at the end of the hearing device facing into the middle ear during use, wherein the hearing device comprises a protrusion extending from the housing and being positioned at the end of the hearing device facing into the middle ear during use and out of contact with the walls of the ear canal during use and wherein two charging areas are positioned on the protrusion, and a charging station according to claim 13.

16. A method for charging a rechargeable battery of a hearing device having a housing configured for being placed at least partially in an ear canal of a user, the housing having an end configured to be positioned in the ear canal of the user and an end configured to be orientated towards the surrounding of the user when the hearing device is positioned at the ear canal of the user, wherein said hearing device comprises a rechargeable battery, at least two charging areas on the surface of the housing of the hearing device, said charging areas enabling recharging the rechargeable battery by applying a voltage from one charging area to another charging area, and wherein at least one charging area is positioned on the hearing device at the end of the hearing device facing into the middle ear during use, wherein the hearing device comprises a protrusion extending from the housing and being positioned at the end of the hearing device facing into the middle ear during use and out of contact with the walls of the ear canal during use and wherein two charging areas are positioned on the protrusion, said method comprising a. placing at least part of the end of the hearing device facing into the middle ear during use into in the concavity of a charging station according to claim 13 such as so that a plurality of charging areas are each in electrical contact with respective electrical contacts, b. applying a voltage from one charging area to another charging area.

* * * * *